(12) United States Patent
Dinkel et al.

(10) Patent No.: US 6,904,995 B2
(45) Date of Patent: Jun. 14, 2005

(54) ARRANGEMENT OF OPERATOR CONTROL ELEMENTS

(75) Inventors: Emil Dinkel, Renningen (DE); Bernd Schmidt, Wildberg-Sulz (DE); Juergen Schrader, Weil im Schönbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/343,711

(22) PCT Filed: Jul. 31, 2001

(86) PCT No.: PCT/EP01/08828

§ 371 (c)(1),
(2), (4) Date: Apr. 29, 2003

(87) PCT Pub. No.: WO02/09973

PCT Pub. Date: Feb. 7, 2002

(65) Prior Publication Data

US 2004/0031667 A1 Feb. 19, 2004

(30) Foreign Application Priority Data

Aug. 2, 2000 (DE) .......................................... 100 37 619

(51) Int. Cl.$^7$ .............................................. B60K 26/00
(52) U.S. Cl. ....................................................... 180/334
(58) Field of Search ................................. 180/334, 333; 74/471 XY

(56) References Cited

U.S. PATENT DOCUMENTS

| 4,723,057 A | * | 2/1988 | Lane, Jr. ................... 200/61.27 |
| 5,959,268 A | | 9/1999 | Hirschfeld |
| 6,234,269 B1 | * | 5/2001 | Salzer et al. ................. 180/333 |
| 6,246,129 B1 | * | 6/2001 | Schaefer ..................... 307/10.1 |

FOREIGN PATENT DOCUMENTS

| EP | 0 591 701 | 4/1994 |
| EP | 0 974 490 | 1/2000 |

* cited by examiner

*Primary Examiner*—Faye M. Fleming
(74) *Attorney, Agent, or Firm*—Crowell & Moring LLP

(57) ABSTRACT

An arrangement of operator controls in a vehicle which are arranged in a plurality of operator control arrays in such a way that only one of these operator control arrays is active in an actuation position and it is easily possible to change over between the groups. The operator control arrays are accommodated on a rotatable carrier element in the armrest of a vehicle seat.

13 Claims, 2 Drawing Sheets

ARRANGEMENT OF OPERATOR CONTROL ELEMENTS

BACKGROUND AND SUMMARY OF THE INVENTION

This application claims the priority of International Application No. PCT/EP01/08828 filed Jul. 31, 2001 and German Application No. 100 37 619.3 filed Aug. 2, 2000, the disclosures of which are expressly incorporated by reference herein.

The invention relates to an arrangement of operator controls, in particular in vehicles.

In modern motor vehicles, a multiplicity of functions can be controlled by electrically acting operating controls, in particular switches, pushbutton keys, or rotary knobs. In spite of the multiplicity of such functions which can be controlled by means of operator controls, the operator controls are also required to be easily accessible, arranged in a clearly organized way and easy to activate.

The present invention is based on the object of specifying an arrangement of operator controls which advantageously fulfils these requirements.

When operator controls are arranged in a plurality of operator control arrays in accordance with the invention, it is possible to place in each case one of the plurality of operator control arrays alternately in an activation position. This operator control array will also be referred to below as an active operator control array in contrast to the inactive operator control arrays which are not in the activation position at that time. The operator controls of the inactive operator control arrays are preferably concealed behind a cover and not accessible to the operator in this position. The activation position is then preferably provided by means of a recess in the cover. The operator controls of the inactive operator control arrays may also be deactivated so that in particular when the operator controls of these inactive operator control arrays are not covered inadvertent contact cannot lead to an undesired function being triggered.

The operator control arrays are arranged in different planes and can preferably be moved together.

The operator controls are preferably electrical switching elements or actuator elements, for example switches, pushbutton keys, rotary actuators or sliding actuators. Electrical signals from and to the operator controls can be transmitted by means of conventional cabling, or in particular inductively or optoelectronically especially when a rotatable operator control array carrier can be continuously rotated in a periodic fashion by means of spring contacts or in a contactless fashion. In particular an arrangement in which at least one operator control array contains a plurality of operator controls is advantageous.

The plurality of operator control arrays are advantageously connected to one another mechanically, in particular in the form of a sequence of operator control arrays which can be stepped in a cyclical fashion.

According to one preferred embodiment, the plurality of operator controls can be arranged about an axis of rotation on a rotatable carrier element. They are preferably offset with respect to one another here by the same polar angles about the axis of rotation. The operator controls of the individual operator control arrays may be oriented here in parallel with or at an inclination with respect to the axis of rotation, in planar or curved surfaces.

The change-over from one operator control array to another as an active operator control array can be carried out according to a first embodiment in that a common rotatable carrier element can be grasped and rotated by the user. In one preferred embodiment with a cover over the inactive operator control arrays, a change-over can be carried out preferably by means of an activation element, preferably an actuator lever or preferably an actuator wheel which is accessible to the user, and by means of mechanical transmission to the carrier of the operator control arrays.

As an alternative, or in addition, the change-over between two operator control arrays can be carried out in a motor-operated fashion in a carrier element which can be rotated about an axis of rotation, that is to say in particular by motor-operated rotation of the carrier element about the axis of rotation. The change-over between two operator control arrays can be triggered, for example, by means of a stepping-activation element, preferably with bidirectional switching direction. Another advantageous embodiment provides a selection array, which can preferably always be activated, for selecting one of the plurality of operator control arrays, preferably with selection keys for the plurality of different operator control arrays.

Instead of mechanically displacing operator controlled arrays it is also possible to provide for operator controls to be provided in a fixed fashion and for their assigned functions to be changed only in accordance with the assignment of the operator controls of different operator control arrays to their individual functions. The function which is assigned to an actuation element at a given time can preferably be indicated by means of light symbols on and/or in the actuation element. It is also possible to implement a mechanical change-over and multiple assignment in a combined fashion.

The individual operator control arrays can preferably be differentiated by touch so that at least an accustomed user can determine or verify the respectively active operator control array solely by manual contact. Differentiation by touch can be carried out, on the one hand, by the actual arrangement and form of the respective operator controls and on the other hand the operator controls can be determined by shaping the surface, or a portion thereof, with a characteristic relief which can be perceived by touch.

Grouping operator controls in an operator control array can be provided in particular for functions which do not relate to the driving operation of the vehicle, for example telephone keypad, radio, air-conditioning system, window settings, seat settings inter alia.

In addition to the individually selectable operator control arrays, a further operator control array with a plurality of operator controls may be permanently arranged in the direct vicinity of the activation position. In particular, the further operator control array may be arranged at one end of an elongated carrier element and be essentially transverse with respect to its longitudinal axis. In another arrangement the selectable operator control arrays are arranged on a carrier element, which can be rotated about an axis of rotation, and the further operator control array is re-entered as an extension of the axis of rotation transversely with respect thereto.

According to one preferred embodiment, the selectable operator control arrays and, preferably, the further operator control array are arranged at the handrest-end of the armrest of a vehicle seat. The plurality of selectable operator control arrays are preferably arranged on a common carrier element so as to be capable of rotating about an axis of rotation which is approximately parallel to the longitudinal axis of the armrest. The further operator control array is arranged on the end surface of the armrest in a surface which drops away towards the front end is preferably curved in a convex fashion. The further operator control array may preferably have operator controls for seat-related functions.

Alternative advantageous positions for the arrangement of operator controls are, in addition to the seat cushions, for example in the instrument panel, in the door lining or as a standing arrangement on the centre console. The arrangement can be expediently modified in each case by adaptation to the position in a detailed fashion.

BRIEF DESCRIPTION OF THE DRAWINGS

The arrangement is illustrated in detail below by means of preferred embodiments and with reference to the drawings, in which.

DETAILED DESCRIPTION OF THE PREFERRED EMBODIMENT

Figure 1:
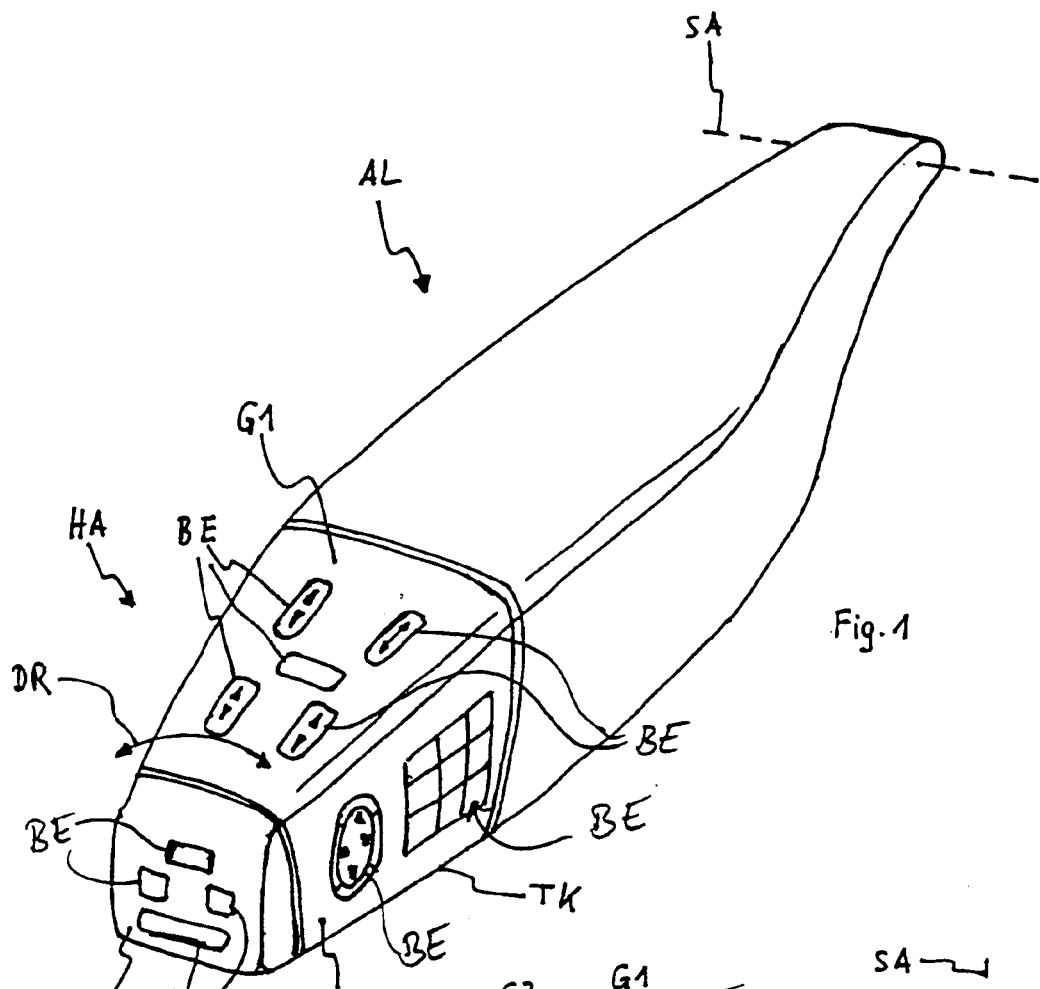
FIG. 1 shows an oblique view of the first embodiment.

FIG. 1 shows an armrest AL of a vehicle seat which can typically pivot about a horizontal pivoting axis SA. The end of the armrest which is remote from the pivoting axis SA will be assumed to form the handrest region HA. In the handrest region, a carrier element TK is mounted so as to be rotatable about an axis DA of rotation. The carrier element may assume a plurality of stable positions in which it preferably engages and which are preferably offset about the axis of rotation by identical angles of rotation. In the case of the carrier element according to FIG. 1 it will be assumed that the stable positions are offset with respect to one another by 90.

Distributed over its external circumference, the carrier element has a plurality of operator control arrays with operator controls BE, of which a first operator control array G1 is shown pointing upwards, and a second operator control array G2 can be seen pointing to the side in FIG. 1. In the illustrated example, the operator controls of the various operator control arrays lie in essentially planar surfaces which are slightly inclined with respect to the axis of rotation in such a way that the carrier element is embodied in the manner of a truncated cone and tapers towards the handrest end of the armrest.

At the front end of the armrest there is a terminating end surface which is oriented as an extension of the axis of rotation and transversely with respect to it and as, in a fixed arrangement, an additional operator control array GZ with further operator controls which may be provided in particular for setting seat perimeters of the driver's seat, for example seat depth, inclination for backrest etc.

Of the plurality of operator control arrays on the carrier element TK, only the upwardly pointing operator control array, that is to say the operator control array G1 in the illustrated position of the carrier element, will be provided, by way of example, for control. Operator control array G1 will be referred to as an active operator control array. The operator controls of the other operator control arrays (G2, . . .) of the carrier element which are inactive with respect to the latter may advantageously be deactivated in this position so that inadvertent activation of such an operator control or an inactive operator control array does not trigger the function which is actually assigned to it. By rotating the carrier element through 90, the operator control array G2 can assume upwardly pointing activation position and thus become the active operator control array.

Figure 3:
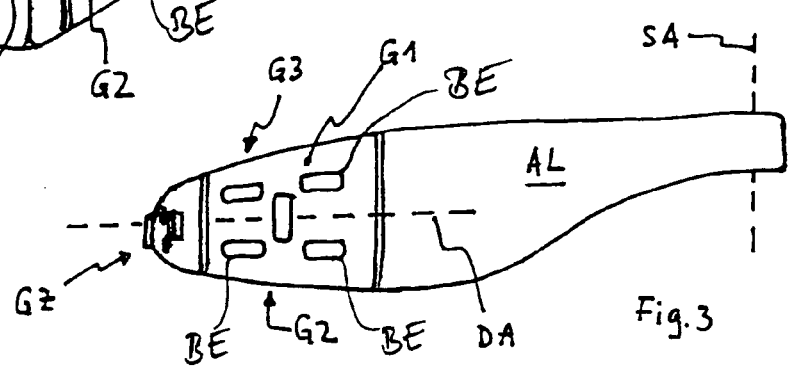
FIG. 3 shows a plan view of the arrangement according to FIG. 1.
Figure 2:
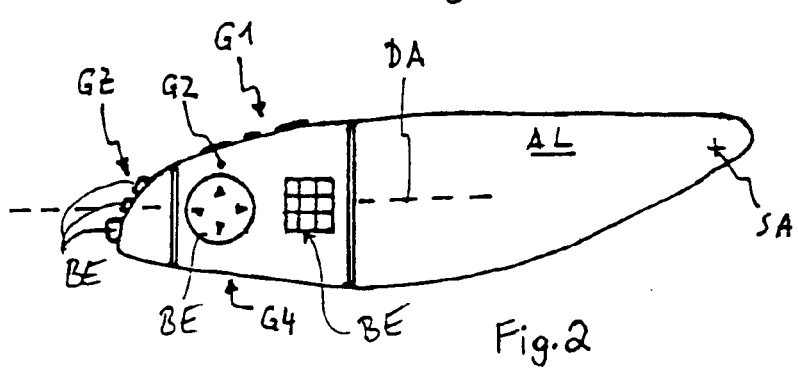
FIG. 2 shows a side view of the arrangement according to FIG. 1.

The arrangement in FIG. 1 is shown in FIG. 2 in a side view and in FIG. 3 in a plan view, further operator control arrays (G3, G4) being indicated on the carrier element.

Figure 4:
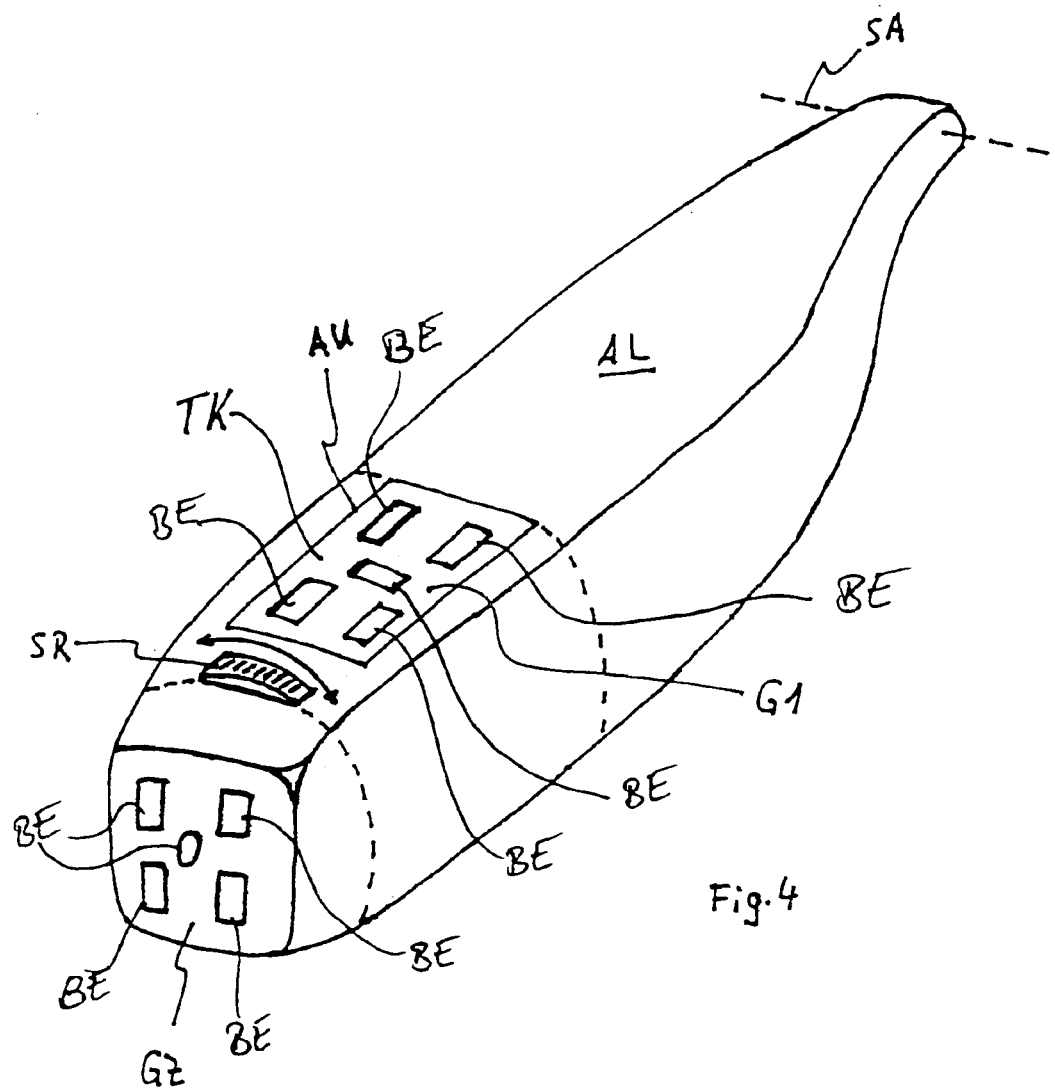
FIG. 4 shows an oblique view of a further embodiment.

FIG. 4 shows an embodiment in which, in contrast to the variant according to FIGS. 1 to 3, the inactive control arrays are not exposed but are instead covered by an external surface of the armrest which is continuous towards the bottom and towards the side. Only the active operator control array G1 is accessible via a portion AU lying at the top of the armrest.

The stepped switching to a different operator control array as active operator control array can be carried out by means of an actuator wheel SR which is coupled to the rotation of the predominantly covered carrier element TK and also projects through the cover. Instead of the actuator wheel, it is, for example, also possible to provide an actuator lever arrangement. In addition, the stepped switching can also be carried out by motor and can be triggered by means of a corresponding switch element, preferably with a directional selection. By means of selector keys it is possible, under certain circumstances, also to select a specific operator control array in a targeted fashion, which operator control array is moved into the activation position by motor. The motor-operated stepped switching can also be advantageously used in the covered embodiment according to FIG. 1.

The examples which were given above in the claims and are illustrated in these figures can be implemented advantageously both individually and in various combinations. The invention is not restricted to the described exemplary embodiment but rather can be modified in many ways within the scope of the abilities of a person skilled in the art.

What is claimed is:

1. An arrangement of operator controls for a vehicle, wherein said operator controls are arranged in a plurality of operator control arrays with each of said plurality of arrays containing at least one of said plurality of operator controls and wherein each of said arrays are in a respective different plane and wherein said arrays are moveable between a plurality of positions wherein one of said planes is an activation plane whereby when ones of said operator controls in a control array are positioned in said activation plane said ones of said operator controls are able to be activated.

2. The Arrangement according to claim 1, wherein said activation plane includes a recess in a covering surface.

3. The arrangement according to claim 3, wherein a plurality of operator control arrays are mechanically connected to one another.

4. The arrangement according to claim 3, wherein the plurality of operator control arrays are arranged on a carrier element which can rotate about an axis of rotation, said operator control arrays being arranged offset in a polar fashion with respect to said axis of rotation.

5. The arrangement according to claim 1, wherein a movement from one of said position to another one of said position is carried out by a user by means of a mechanical actuator element.

6. The arrangement according to claim 1, wherein movement from one position to another position is carried out by a motor in accordance with the activation of a switch.

7. The arrangement according to claim 1, wherein the individual operator control arrays can be differentiated by touch.

8. The arrangement according to claim 1, wherein at least one operator control is arranged in a fixed position and is assigned to a plurality of operator control arrays with different functions depending on the operator control array selected.

9. The arrangement according to claim 1, wherein the operator control arrays are arranged in an armrest of a vehicle seat.

10. The arrangement according to claim 4, wherein an additional operator control array is arranged as an extension of the axis of rotation, on a surface which is transverse with respect to the axis of rotation.

11. The arrangement according to claim 10, wherein operator controls of the additional operator control array are assigned seat-related functions.

12. The arrangement according to claim 1 wherein at least one operator control array contains a plurality of operator controls.

13. A vehicle operator control structure comprising:

a support structure;

a rotatable carrier element attached to said support structure wherein said rotatable carrier element has a plurality of surfaces each lying in a different plane, wherein at least two of said surfaces each include an operator control array with each array including at least one operator control, wherein said surfaces are rotatable among said planes and wherein one of said planes is an activation plane wherein when one of said arrays is in said activation plane the at least one operator control in said activation plane is functional.

* * * * *